April 18, 1933. G. H. FREYERMUTH 1,904,439
PRODUCTION OF HYDROGEN FROM HYDROCARBON GASES
Filed March 5, 1930
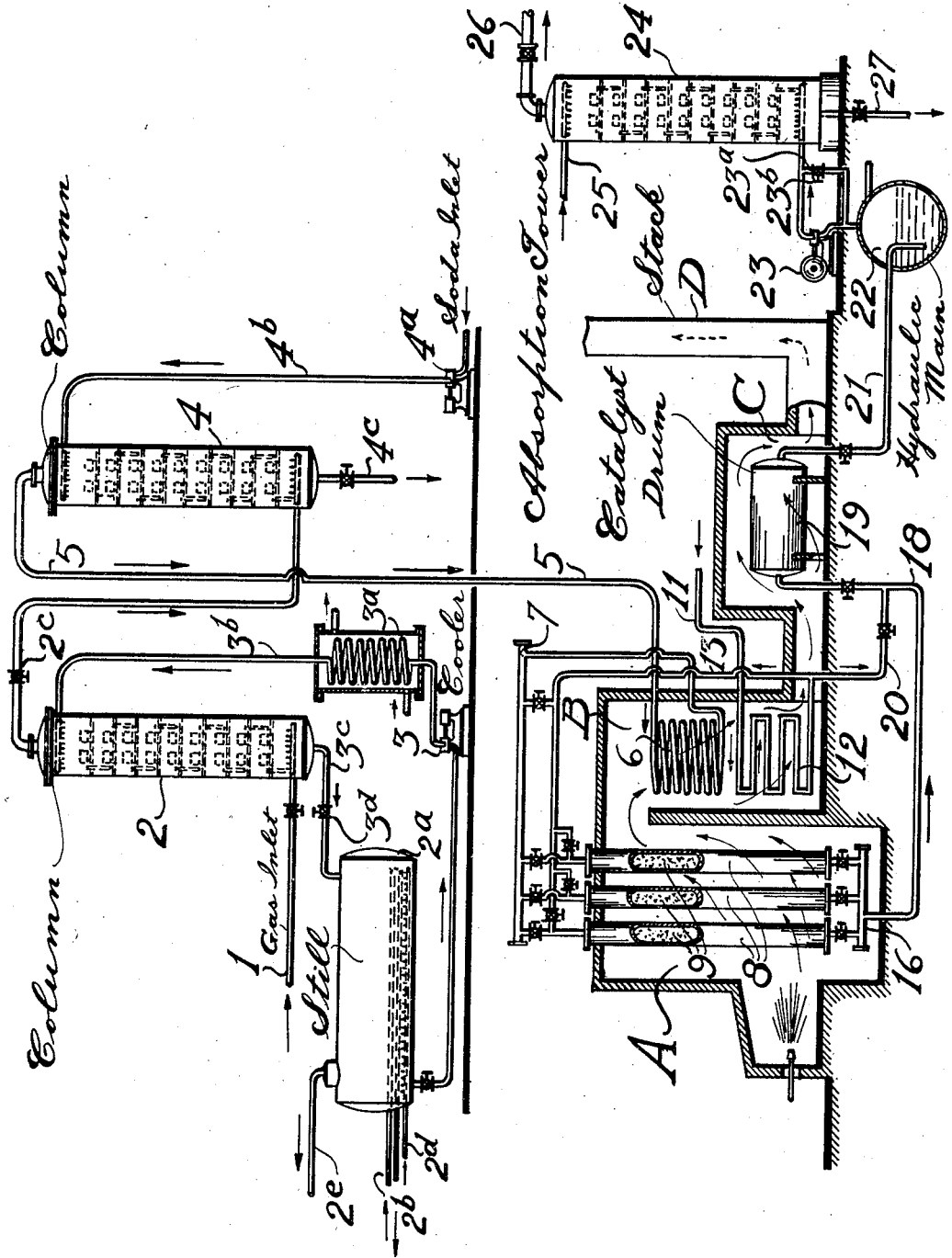
INVENTOR
George H Freyermuth
BY
W. E. Currie
ATTORNEY Patented Apr. 18, 1933

1,904,439

UNITED STATES PATENT OFFICE

GEORGE H. FREYERMUTH, OF ELIZABETH, NEW JERSEY, ASSIGNOR TO STANDARD OIL DEVELOPMENT COMPANY, A CORPORATION OF DELAWARE

PRODUCTION OF HYDROGEN FROM HYDROCARBON GASES

Application filed March 5, 1930. Serial No. 433,322.

The present invention relates to an improved process for the production of hydrogen, or gaseous mixtures rich in hydrogen from hydrocarbon gases by reaction with steam. The present invention will be fully understood from the following description and drawing which illustrates one form of the apparatus which may be used in my process.

The drawing is a diagrammatic view in sectional elevation of an apparatus constructed to carry out the process herein described and indicates the flow of the materials used in the process.

Referring to the drawing numeral 1 indicates a gas line supplying natural or refinery gas from any suitable source (not shown) to the base of column 2 preferably under 3 to 10 atmospheres pressure. Here the gas is scrubbed by an oil which is a suitable absorbent for light gaseous hydrocarbons, such as gas oil, and which is introduced to the tower by pump 3 through cooler 3a and line 3b. The oil after leaving the tower passes through line 3c, pressure reducing valve 3d into tank or still 2a. Heat may be supplied to this vessel through closed steam coil 2b or open steam coil 2d or both. Light hydrocarbons and a small percentage of sulphur compounds also taken up by the oil from the gas escape through line 2e. It should be understood, however, that I may use other convenient methods for removing light hydrocarbons such as butane, pentane, propylene and butylene from the gas, as will be explained later. The gas after leaving tower 2 passes through valve 2c where the pressure may or may not be reduced depending upon whether the succeeding stages of the process are to be operated at the pressure of the oil scrubbing stage or not. The gas then flows to column 4 where the gas is scrubbed with caustic soda, or other suitable sulfur removing agents, supplied by pump 4a through line 4b to the top of the tower. The caustic is removed from tower 4 through line 4c. The gas flows through line 5 to preheating coil 6 from which it passes through manifold 7 to a plurality of conversion tubes 8 (only 3 tubes are shown) packed with a suitable catalyst 9. Steam entering pipe 11 is superheated in a coil 12, passes to line 13, from which it is admitted in regulated quantities to the tubes 8. The conversion tubes are mounted in the high temperature section of a suitable furnace A, the preheating coils 12 and 6 being in a lower temperature zone B of the same furnace in this form of my invention. The gases leaving tubes 8 discharge into manifold 16 and flow to secondary conversion chamber 19 which is heated in a third zone C of the furnace. Additional steam may be supplied to convertor 19 from coil 12 through line 20 and the material leaving this secondary conversion zone passes by line 21 to hydraulic main 22. Cooled gas passes therefrom to compressor 23 or through by-pass line 23a and valve 23b and thence to an absorption tower 24 filled with plates or other contact means. If the conversion stages are operated under lower pressure than that used in absorption tower 24, valve 23b is closed and compressor 23 is operated. Alternately, the natural or refinery gas may be supplied through line 1 with sufficient pressure so that valve 2c and valve 23b may be left open and the whole process operated under uniform pressure in so far as the pressure drop of the apparatus permits. In passing upward through tower 24 the gas comes in contact with water which is introduced at the top by pipe 25 for the purpose of dissolving carbon dioxide. The purified gas comprising largely hydrogen leaves the tower by line 26, and the water is discharged by line 27.

In the operation of the present process it has been found that purified, natural or refinery gases comprising hydrocarbons may be converted by means of steam to produce carbon monoxide or carbon dioxide and hydrogen. It is desirable to remove at least the major quantity of sulphur compounds from the gas to be converted by means of a preliminary caustic wash or otherwise. The primary conversion reaction occurs above about 1200° F. with a moderate excess of steam, 50 to 80%, that is to say, under 100% excess when the gas is properly purified as indicated below in the presence of a catalyst containing nickel, with or without other elements or compounds such as alumina, thoria and the like. This reaction results in the formation of hydrogen and carbon monoxide. The reaction mixture is passed from the first stage to a second stage at a much lower temperature, for example; about 800° F. and a further excess of steam may be added to the gas. In this step the carbon monoxide produced in the first stage is converted to carbon dioxide and additional hydrogen. The second reaction may be catalyzed by a number of suitable materials such as iron oxide. The gas mixture leaving the second conversion stage is cooled and the carbon dioxide removed by some suitable means such as absorption by water under pressure. The final gas consists substantially of hydrogen except for 1 to 2 percent of carbon monoxide or carbon dioxide and about one percent or less of unconverted methane.

It has been found in the operation of the process that the nickel catalyst gradually loses its catalytic activity, owing to the deposition of carbon on the active surface. This may be removed by use of excessive quantities of steam, but it is often uneconomical to use more than 100% excess steam. I have found that the convertor tubes may be operated with little or no deposition of carbon on the catalyst and with undiminished activity for substantially longer periods if the higher hydrocarbons in the gas are removed before the conversion stage. The hydrocarbons to be removed consist of the heavier normally liquid members of the paraffin and olefin series, such as butane, butylene and heavier, which are found in small quantities even in relatively dry gases. If desired, propane, propylene and even ethylene may be removed with advantage. In order to remove these constituents from the gas or to reduce their content to as low a figure as is practical, I may use any suitable method, for example, the gas may be scrubbed with a suitable absorbent oil such as gas oil or mineral seal oil under about 2 to 10 atmospheres pressure, or even higher pressure, sufficient to remove substantially all traces of the normally liquid hydrocarbons. The hydrocarbons absorbed by the oil from the gas may be eliminated from the oil by release of pressure, or by application of heat or both, or steam distillation may be employed. Similarly, I may use in a known manner towers packed with active charcoal, or I may employ other convenient equivalent means. It should be understood that it is preferable to remove the major portion of sulphur compounds in the gas flowing to the conversion stages and that means in addition to those used for hydrocarbon removal may be necessary for this purpose, for example; caustic or soda ash wash.

My invention is not to be limited by any theory of the mechanism of the reactions nor to any specific example which may have been given for purpose of illustration, but only by the following claims in which I wish to claim all novelty inherent in my invention.

I claim:

1. In a process for production of hydrogen by the catalytic reaction of hydrocarbon gas and steam, the improvement which comprises selectively removing heavier constituents from the hydrocarbon gas prior to reaction.

2. Process according to claim 1 in which substantially all traces of normally liquid hydrocarbons are removed from the gas prior to reaction.

3. In a process for production of hydrogen by reaction of gaseous hydrocarbons with steam in the presence of a nickel containing catalyst at an elevated temperature the step of removing substantially all traces of normally liquid hydrocarbons prior to the reaction.

4. Process according to claim 3 in which the normally liquid hydrocarbons are removed by scrubbing with a suitable solvent at a pressure in excess of atmospheric pressure.

5. Process according to claim 3 in which the normally liquid hydrocarbons are removed by scrubbing with a hydrocarbon liquid under pressure in excess of two atmospheres.

6. In a process for production of hydrogen from mixed hydrocarbon gases by the action of steam and a suitable catalytic agent, the improvement comprising the removal of heavier hydrocarbon constituents by scrubbing with a hydrocarbon oil under pressure of 2 to 10 atmospheres, prior to the reaction.

7. Process according to claim 6 in which the oil scrubbing step is followed by an alkali wash.

8. Process according to claim 6 in which dissolved hydrocarbon constituents are removed from the oil by reduction of pressure and application of heat.

9. In a process for production of hydrogen from refinery gas by the action of steam in presence of a nickel containing catalyst, the steps of scrubbing the gas with oil under pressure sufficient to effect a substantially complete removal of normally liquid hydrocarbons and then with an aqueous alkaline agent prior to reaction with steam.

10. Process according to claim 9 in which dissolved hydrocarbons are removed from the oil under reduced pressure and the stripped oil is returned to the scrubbing step.

GEO. H. FREYERMUTH.